(12) United States Patent
Hsu

(10) Patent No.: US 11,317,746 B2
(45) Date of Patent: May 3, 2022

(54) CHOPSTICK BUDDIES

(71) Applicant: Fred Hsu, Port Washington, NY (US)

(72) Inventor: Fred Hsu, Port Washington, NY (US)

( * ) Notice: Subject to any disclaimer, the term of this patent is extended or adjusted under 35 U.S.C. 154(b) by 0 days.

(21) Appl. No.: 17/200,852

(22) Filed: Mar. 14, 2021

(65) Prior Publication Data

US 2021/0282579 A1    Sep. 16, 2021

Related U.S. Application Data

(63) Continuation-in-part of application No. 16/731,037, filed on Dec. 31, 2019, now Pat. No. 11,246,436.

(51) Int. Cl.
*A47G 21/06* (2006.01)
*G09B 19/24* (2006.01)

(52) U.S. Cl.
CPC ........... *A47G 21/103* (2013.01); *G09B 19/24* (2013.01)

(58) Field of Classification Search
CPC .............................. A47G 21/103; G09B 19/24
See application file for complete search history.

(56) References Cited

FOREIGN PATENT DOCUMENTS

| | | |
|---|---|---|
| JP | 2005034248 A | 2/2005 |
| JP | 3153524 U | 9/2009 |
| JP | 2010125017 A | 6/2010 |
| KR | 20170001148 U | 3/2017 |

*Primary Examiner* — Robert J Utama

(57) ABSTRACT

Chopstick buddies illustrated by various embodiments of the present disclosure are attachments to a chopstick. Chopstick buddies allow a human hand to avoid the awkward thumb pose required by the standard chopstick grip, while still being able to hold both chopsticks firmly as extensions of fingers. Chopstick buddies accomplish this without interfering with finger movements of the standard grip. As a result, users continue to enjoy benefits of the standard grip, despite not complying with the required and awkward thumb pose. These benefits include: the ability to extend tips of the chopsticks wide apart to embrace a food item, to manipulate chopsticks with dexterity, and to generate enough compression force to hold food items firmly between tips, with ease.

10 Claims, 18 Drawing Sheets

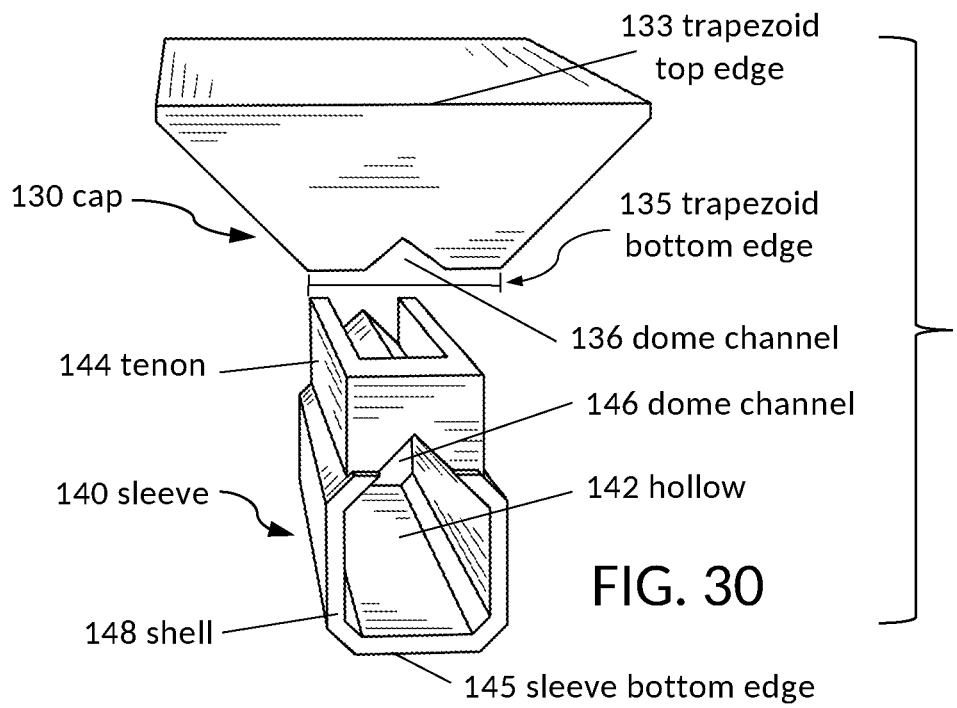
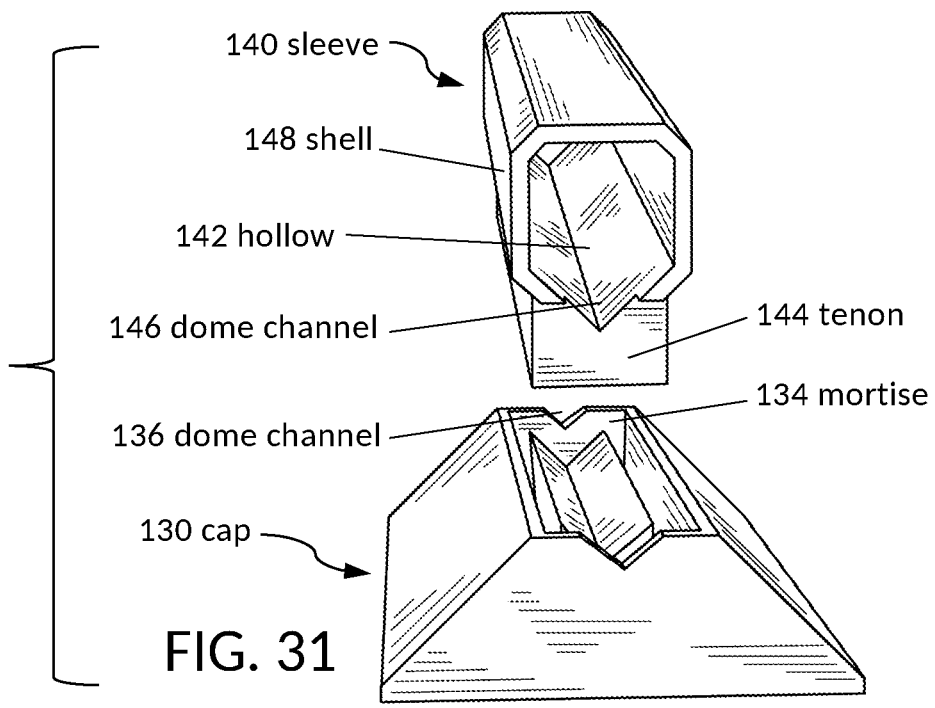

130 cap 133 trapezoid top edge 135 trapezoid bottom edge 134 mortise

CHOPSTICK BUDDIES

CROSS-REFERENCE TO RELATED APPLICATION

This application is a continuation-in-part of my U.S. patent application entitled "Training Chopsticks", assigned Ser. No. 16/731,037, filed Dec. 31, 2019, which is incorporated by reference herein in its entirety, and is hereafter referred to as the '037 application. Referenced items from the '037 application include: the awkward and unnatural thumb pose required by the standard chopstick grip, the discoveries of anatomical limitation of the hand with respect to the use of chopsticks, and the elevated thumb rest to cope with such limitations.

This application also builds upon discoveries of finger-chopstick dynamics that I have disclosed in my U.S. patent application entitled "Ergonomic Chopsticks", assigned Ser. No. 16/695,029, filed Nov. 25, 2019, which is incorporated by reference herein in its entirety, and is hereafter referred to as the '029 application. Referenced concepts and principles from the '029 application include: the standard grip, the alternating motion of the standard grip, the closed posture, the open posture, movements of fingers in rolling and manipulating chopsticks, and the definition of unrestricted chopsticks.

TECHNICAL FIELD OF THE INVENTION

Various embodiments of the present disclosure relate to chopsticks, and in particular to attachments to a plain chopstick (FIG. 1) which allow a human hand to avoid the awkward thumb pose required by the standard chopstick grip, while still being able to hold both chopsticks firmly as extensions of fingers (FIG. 2).

BACKGROUND OF THE INVENTION

Unlike forks and spoons, chopsticks are not intuitive to use. There are many ways for a human hand to grip a pair of chopsticks, and to wield them such that tips of these chopsticks can be made to grasp and to release food items. However, only one grip is generally considered the standard way to manipulate chopsticks. As disclosed in my '029 application, this standard grip is not a single static configuration of fingers and chopsticks, but a fluid and concerted motion of fingers pushing, pulling and rolling these chopsticks, moving them back and forth between two ends of a range of dynamic configurations: the open posture (FIG. 3) and the closed posture (FIG. 4). The thumb plays two roles simultaneously. First, thumb base 50 pressed down on bottom chopstick 60 to secure it against knuckle 52 of the ring finger and purlicue 54 (FIG. 3). Secondly, thumb pad 56 rolls top chopstick 62 together with index finger 57 and knuckle 58 of the middle finger, using the planetary gear principle. In both roles, the thumb is instrumental in enabling the hand to wield both chopsticks as securely-fastened extensions of fingers.

This rolling motion is a central component of the standard grip. It explains why the seemingly lever-like motion does not cause chopsticks to repeatedly rub against sensitive finger skin, as a mechanical lever with a hinge would. It enables the human hand to exercise dexterity to achieve the full range of finger configurations between the two postures. This dexterity in turns allows the hand to manipulate both small and large food items, with either miniscule or significant clutching forces as situations call for.

As disclosed in my '037 application, many adult learners find it difficult to master the rolling of the top chopstick using the thumb pad, and simultaneously master the use of the thumb base to secure the bottom chopstick. The main reason is that for the thumb to pull this double duty, it needs to be placed in an unnatural pose which is not required for other human activities. This awkward thumb pose is illustrated in FIG. 5. This pose requires that the base segment of the thumb be flexed inward, indicated by flexed MP joint 64, while the tip segment of the thumb be extended outward, indicated by extended IP joint 66.

FIG. 6 and FIG. 7 illustrate how the thumb secures both chopsticks, from a viewing angle corresponding to that of FIG. 5, for the open posture and the closed posture, respectively. The thumb is the only finger pressing both chopsticks towards the palm, against the index finger, the middle finger, the ring finger, and the purlicue. The pose of the thumb in these figures is difficult for most people to master, because humans do not instinctively know how to put the thumb into this pose, and hold it for a long time. Again, this pose requires that the base segment of the thumb be flexed inward, indicated by flexed MP joint 64, while the tip segment of the thumb be extended outward, indicated by extended IP joint 66.

When a beginner focuses on this unnatural thumb pose, to secure both chopsticks with the thumb, the index finger, the middle finger, the ring finger and the purlicue, then the beginner is unable to command these same fingers to roll, for instance, the top chopstick. If the beginner focuses instead on commanding fingers to roll the top chopstick, then these same fingers lose their secure hold on both chopsticks, as the unattended thumb reverts back towards a natural state where both of its segments bend together, or straighten together. As a result, the hand no longer grips both chopsticks firmly. And these chopsticks are easily pushed out of position by fingers that try to manipulate them.

My '037 application addressed the issue facing adult learners, with training chopsticks. One version of these training chopsticks is shown in FIG. 8. Top chopstick 72 is furnished with circumferential groove 74, and bottom chopstick 70 connects to groove 74 via coupling bar 76 with a C-hook head. The circumferential groove is shaped such that the top chopstick is able to roll around its longitudinal axis for 90 degrees, and also able to pitch up to extend tips of chopsticks apart, or to pitch down to bring tips of chopsticks together, as prescribed by the standard grip. This allows a learner to securely hold both chopsticks, without having to consciously maintain the unnatural thumb pose shown in FIG. 6 and FIG. 7 at all times.

The cost of this training assistance is a compromise in the range of chopstick movements. The design of the C-hook and the groove places a limit on the pitch angle of the top chopstick, compared to what can be done with uncoupled, plain chopsticks. This results in a reduced distance between tips of training chopsticks at the open posture, spanning only the width of three Italian sausages, compared to that of plain chopsticks, easily spanning the width of four Italian sausages.

As disclosed in my '037 application, some lifelong chopstick users are unable to use the standard grip despite lifelong attempts to master it. They instead settle with alternative chopstick grips that are not as efficient nor as dexterous. I have, through field research, found that many such users are physically unable to make the unnatural thumb pose (FIG. 5) required by the standard grip. These users have anatomical limitations due to injuries or congenital conditions. When forced to use the standard grip, the tip segment of their thumb remains bend, indicated by flexed IP joint 68, as shown in FIG. 9 and FIG. 10. They are unable to completely extend the tip segment of their thumb, while flexing the base segment of the same thumb. While attempting the unnatural thumb pose, many users report feelings of cramping. This uncomfortable feeling results not only from the unnatural shape of the thumb pose, but also from the need to bring the thumb base close to the ring finger, in order to securely hold the bottom chopstick in place, as shown previously in FIG. 6 and FIG. 7.

For these lifelong users, their arched thumb is unable to keep the bottom chopstick from sliding out of the standard grip position, again illustrated in FIG. 9 and FIG. 10. In fact, the angle of the arch constantly nudges the bottom chopstick out of position. The bending of the tip segment of the thumb also makes it hard for the pad of the thumb to properly grip the top chopstick, thus hampering the rolling of the top chopstick from the open posture in FIG. 9 to the closed posture in FIG. 10. Compare these illustrations to those shown in FIG. 6 and FIG. 7 where proper thumb pose is applied, to see how a small difference in thumb pose affects the entire standard grip motion. For users suffering from anatomical limitations, no amount of practice will allow them to wield plain chopsticks properly using the standard grip.

My '037 application addressed the issue facing users with anatomical limitations, with a version of training chopsticks equipped with an extra elevated thumb rest on the bottom chopstick, as shown in FIG. 11. The elevated thumb rest 78 allows people who are otherwise unable to use the standard grip, to use the standard grip. FIG. 12 and FIG. 13 illustrate how users can simultaneously secure the bottom chopstick and roll the top chopstick, using the thumb, without the unnatural thumb pose. The elevated thumb rest 78 meets the arch of the thumb, allowing a non-standard thumb pose. The thumb is now able to hold the bottom chopstick securely, even with the flexed IP joint 68, because the added height of thumb rest 78 makes up for the space created by flexed IP joint 68.

The cost of this thumb rest assistance is an even more severe compromise in the range of chopstick movements. Because an arched thumb covers less distance between the tip of the thumb and the base of the thumb, compared to the standard but unnatural thumb pose, the coupling bar is shortened, to allow the arched thumb to reach the top chopstick and to manipulate it firmly with the index finger and the middle finger. The range of chopstick movements is thus further reduced.

BRIEF SUMMARY OF THE INVENTION

As stated earlier in the background section, chopsticks are not intuitive to use. Many beginners manage to quickly find simpler but suboptimal grips that allow them to eat with chopsticks. Some find themselves stuck in their own alternative grips with a limited range of motion, without much tension or compression force. This issue is not limited to adult beginners; a large percentage of lifelong chopstick users in Asia never venture out of various alternative grips adopted in childhood. Some of these lifelong users are in fact not able to physically make the thumb pose required by the standard grip. My '037 application addressed these issues with training chopsticks and a thumb rest. But these training chopsticks severely restricted the range of chopstick movements. Furthermore, these training chopsticks need to be made as a set, complete with the coupling bar, and thus users are unable to use their own favorite chopsticks with preferred length, size and materials. The thumb rest cannot be used without the coupling bar. This is because without the coupling bar, an independent bottom chopstick with a thumb rest will slip, roll and topple out of its proper placement.

Various embodiments of the present disclosure continue, in part, from my '037 application, building upon the thumb rest, while addressing the deficiencies identified above. Present disclosure describes embodiments that utilize a trapezoid prism for the portion of the rest that supports fingers.

The first embodiment of the present disclosure is shown in FIG. 14 and FIG. 15. The embodiment takes the shape of a trapezoid prism called a cap. The cap is connected to a hollowed sleeve in the shape of a polygonal tube. The cap and the hollowed sleeve together form a "chopstick buddie".

FIG. 16 illustrates how the trapezoid prism is mounted via the polygonal tube on a bottom chopstick. FIG. 17 shows how the trapezoid prism provides a large skin contact area to support the thumb base, without interfering with moving parts of the hand and its fingers. Observe from FIG. 17 how the thumb is no longer required to make the awkward and unnatural thumb pose as shown in FIG. 7. This is because the trapezoid prism fills in the gap created by the arched thumb. The user is thus able to secure the bottom chopstick in place, without needing to make an awkward effort. With the entire segment of the thumb base on the large skin contact area, the trapezoid prism does not topple over, despite its height separating the thumb away from the index finger. It thus not only serves as a thumb rest, but also replaces the coupling bar from the training chopsticks in my '037 application. As a result, a user is no longer constrained by the limited range of chopstick movements imposed by a coupling bar.

The first embodiment of chopstick buddies is designed as a removable attachment to plain chopsticks, as illustrated in FIG. 16. The attachment can be used with a variety of commercially-available chopsticks of different lengths and thicknesses. In other embodiments, a chopstick buddie may be permanently shaped as a part of a bottom chopstick.

Chopstick buddies can be used with the cap surface facing up or down. That is, the finger-supporting area can be turned upward, for use as a thumb rest. The same area may be turned downward, for use as a ring knuckle rest. When a bottom chopstick is equipped with both a thumb rest and a ring knuckle rest as shown in FIG. 18, then the thumb and the ring finger grip the two support surfaces from opposite directions as shown in FIG. 19. This sandwiching configuration makes the bottom chopstick even more stable in a moving hand. Yet again, the trapezoid prism shape of a buddie provides a large contact and stabilization area for the ring knuckle, just like it does for the thumb base. And again, this support is provided without interfering with moving fingers, specifically the pulp of the middle finger, thanks to the trapezoid shape.

Using two chopstick buddies together increases further the distance between the thumb base and the ring finger knuckle, relieving the thumb of cramping pressure associated with the unnatural standard grip thumb pose. Compare FIG. 19 to FIG. 17, to see the change in distance between the thumb base and the ring finger knuckle. The distance doubles with the use of two chopstick buddies, compared to using only one. Compare FIG. 17 to FIG. 7, to see the change in distance between using one buddie, compared to none.

As described, the first embodiment consists of a trapezoid prism cap connected to a chopstick sleeve, as shown in FIG. 14 and FIG. 15. The support area of the cap may be made large or small, to suit different sizes of hand. The height of the trapezoid may be similarly changed for different users. The sleeve is hollowed in the center, as illustrated in FIG. 22 and FIG. 25. The sleeve can be made with different diameters and shapes, to fit different sizes and types of chopsticks. Fine adjustment of the sleeve placement on the chopstick can be done with a tapered adjustment strip, shown in FIG. 26. This adjustment strip is inserted into the L-shaped slot in the trapezoid prism body, and used as a wedge, as shown in FIG. 27. But many other mechanisms for fastening a chopstick buddie to a chopstick can be used as well.

The second embodiment of the present disclosure is shown from different perspectives in FIG. 28, FIG. 29, FIG. 30, and FIG. 31. This embodiment separates the cap from the sleeve, such that each can be produced in different shapes and dimensions according to needs. Different types of caps may be used with different types of sleeves. For instance, a large cap may be used on a small sleeve, for use by a person with a large hand holding a thin pair of chopsticks. Or vice versa. The cap and the sleeve are connected via a mortise-and-tenon joint in this embodiment. The cap houses the mortise recess. The sleeve provides the tenon.

This disclosure, as a continuation of my '037 application, refines the previous thumb rest into a versatile chopstick buddie. Chopstick buddies can be used on any plain chopsticks. A chopstick buddie can be used to support either the thumb or the ring finger knuckle. Its unique trapezoid prism shape allows the hand to stabilize and secure the bottom chopstick without needing to consciously labor to achieve said result. Chopstick buddies enable users with anatomical limitations to wield chopsticks using standard grip finger movements. Unlike the thumb rest from my '037 application, chopstick buddies do not require the use of training chopsticks with a coupling bar. Thus, chopstick buddies allow a user to manipulate chopsticks without any constraints. According to the classification of chopsticks disclosed in my '029 application, a pair of chopsticks with buddies mounted on the bottom chopstick remains what I call unrestricted chopsticks. Chopstick buddies confer the same degree of freedom, dexterity and power as plain chopsticks. Yet they allow users who otherwise could not use the standard grip to use the standard grip.

BRIEF DESCRIPTION OF THE DRAWINGS

FIG. 30 is another perspective of the cap and sleeve from FIG. 28, showing the left side of the cap and of the sleeve, and highlighting the dome channel seen above the hollowed core modeled after a chopstick.

FIG. 31 is another perspective view of the cap and sleeve from FIG. 30, now flipped upside down, so that the sleeve with a tenon is shown on top, and the cap with a mortise recess is shown on the bottom.

REFERENCE NUMERALS

Figure 1:
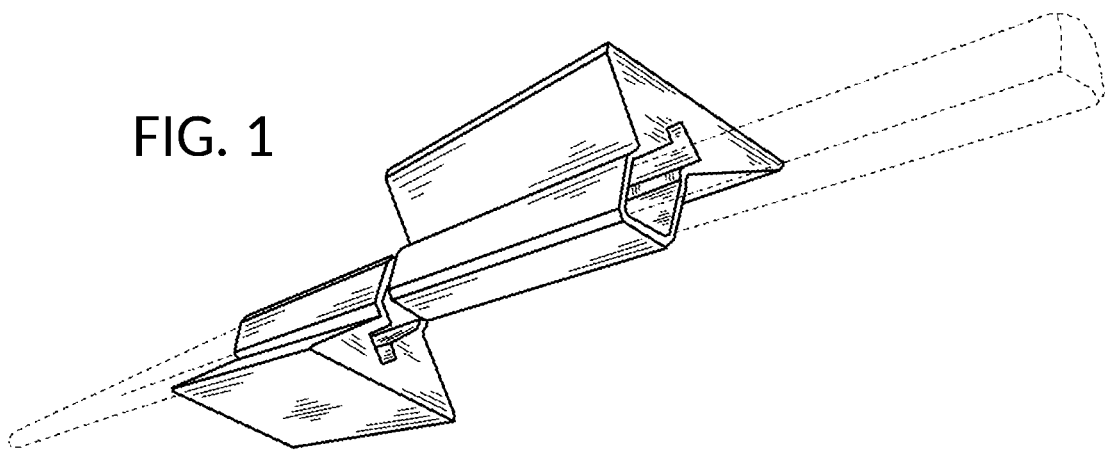
FIG. 1 is a view of two chopstick buddies of the first embodiment of the present disclosure, mounted on a plain chopstick with caps facing away from each other, where the chopstick is drawn with dotted lines.

It is noted that like parts are designated by like reference numerals throughout the accompanying drawings. A list of numbered parts is presented below:

50. Base segment of the thumb of a right hand
52. Distal knuckle of the ring finger
54. Purlicue of a right hand
56. Thumb pad on the tip segment of the thumb
57. Tip segment of the index finger
58. Distal knuckle of the middle finger
60. Plain bottom chopstick
62. Plain top chopstick
64. Flexed MP joint of the thumb, bending the base segment of the thumb inward
66. Extended IP joint of the thumb, flattening the tip segment of the thumb outward
68. Flexed IP joint of the thumb, bending the tip segment of the thumb inward
70. Bottom chopstick of a version of training chopsticks from my '037 application
72. Top chopstick of a version of training chopsticks from my '037 application
74. Groove on top chopstick 72 for receiving the coupling bar 76
76. Coupling bar with a C-hook head that fits in groove 74 from my '037 application
78. Elevated thumb rest in a version of training chopsticks from my '037 application
110. Trapezoid prism cap of the first embodiment of present chopstick buddies
112. Hollowed sleeve of the first embodiment of present chopstick buddies
114. Support surface provided by the top face of trapezoid prism cap 110
116. L-shaped channel carved into the trapezoid prism cap 110
118. Gripping grooves engraved on support surface 114
120. A cap serving as a thumb rest with its support surface facing upward
122. A cap serving as a knuckle rest for the ring finger with downward support surface
124. Wide, top edge of cap 110 defining the width of support surface 114
125. Narrow, bottom edge of hollowed sleeve 112
126. An adjustment strip with an L-shaped end which fits into L-shaped channel 116
130. Trapezoid prism cap of the second embodiment of present chopstick buddies
132. Support surface provided by trapezoid prism cap 130
133. Wide, top edge of cap 130 defining the width of support surface 132
134. Mortise portion of the mortise-and-tenon joint of the second embodiment
135. Narrow, bottom edge of trapezoid prism cap 130
136. Dome channel carved out of cap 130 for adjustment handle 156
140. Hollowed sleeve of the second embodiment of present chopstick buddies
142. Hollowed core space through which a plain chopstick can be inserted
144. Tenon portion of the mortise-and-tenon joint of the second embodiment
145. Narrow, bottom edge of hollowed sleeve 140

146. Dome channel carved out of tenon 144 of sleeve 140 for adjustment handle 156

148. Thin shell of sleeve 140 that surround hollowed core 142

150. Common household item—a cotton swab

156. A segment of cotton swab 150 cut out for use as an adjustment wedge/handle

Further areas of applicability of the present disclosure will become apparent from the detailed description provided hereinafter. It should be understood that the detailed description and specific examples, while indicating some embodiments of the disclosure, are intended for purposes of illustration only and are not intended to limit the scope of the disclosure.

DETAILED DESCRIPTION OF THE INVENTION

The present disclosure involves chopstick buddies. Chopstick buddies are attachments to a plain chopstick. More than one chopstick buddie can be attached to a plain chopstick. FIG. 1 shows two chopstick buddies attached to one plain chopstick, with their trapezoid prism bodies facing away from each other.

Figure 2:
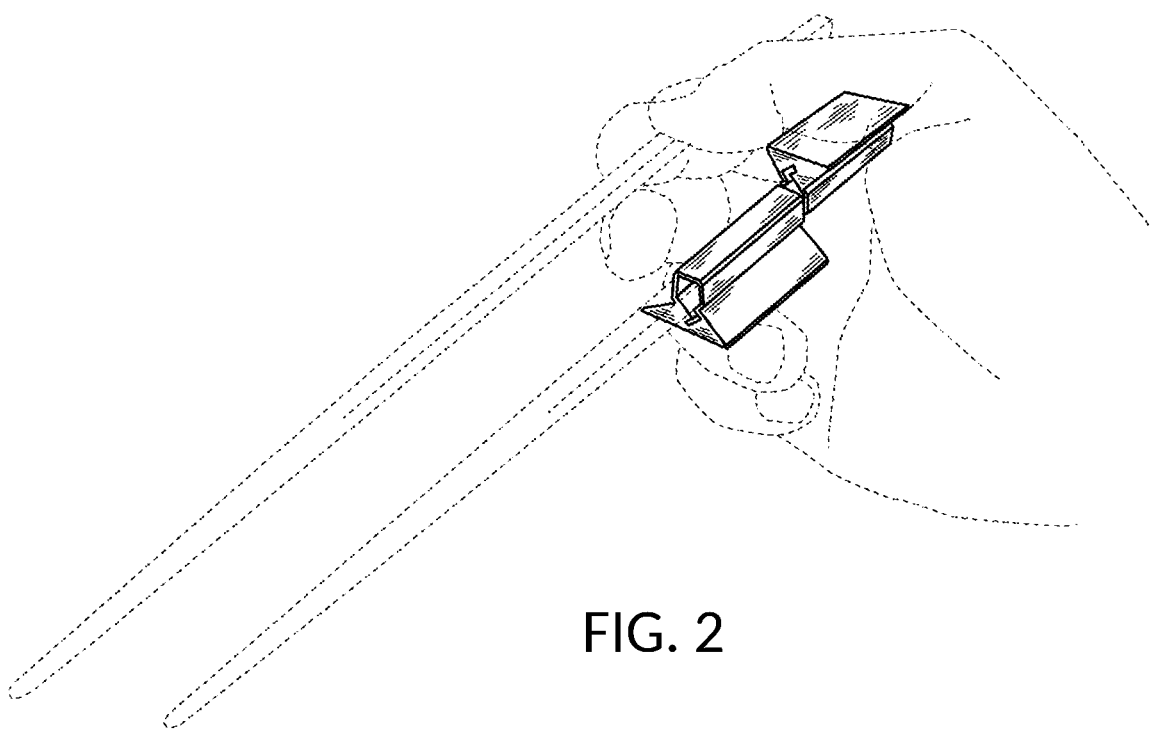
FIG. 2 is a view of a right hand holding a pair of plain chopsticks, assisted by the two chopstick buddies of the first embodiment mounted on the bottom chopstick, such that the thumb remains comfortably distant from the ring finger knuckle, and that the IP joint of the thumb does not need to be unnaturally extended flat.
Figure 3:
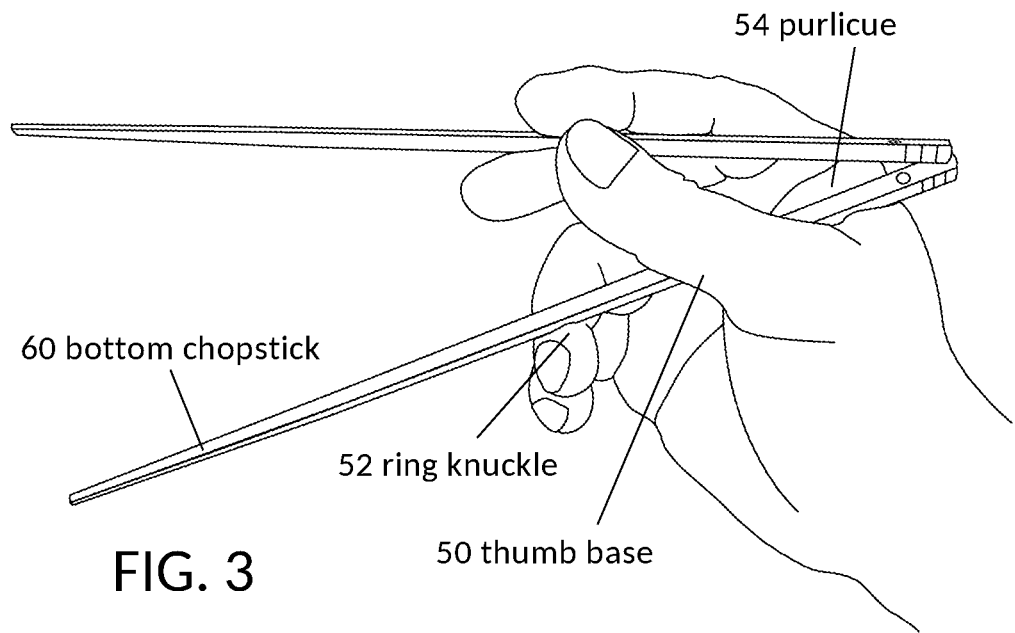
FIG. 3 is a view of a right hand holding a pair of plain chopsticks, at the open end of the standard grip and alternating motion.

Chopstick buddies allow a human hand to wield chopsticks with the traditional, standard grip and its finger motions, without the awkward and unnatural thumb pose that is otherwise required by the standard grip. FIG. 2 shows a human hand using chopsticks without having to bring the thumb base uncomfortably close to the ring finger, and without needing to flatten the thumb into an unnatural pose at the same time. This is possible, thanks to the two chopstick buddies mounted on the bottom chopstick. These chopstick buddies separate the thumb far apart from the ring finger. Yet their trapezoid prism construction allows the thumb and the ring finger to firmly secure the bottom chopstick as if it were fastened to the hand.

First Embodiment of Chopstick Buddies

Figure 14:
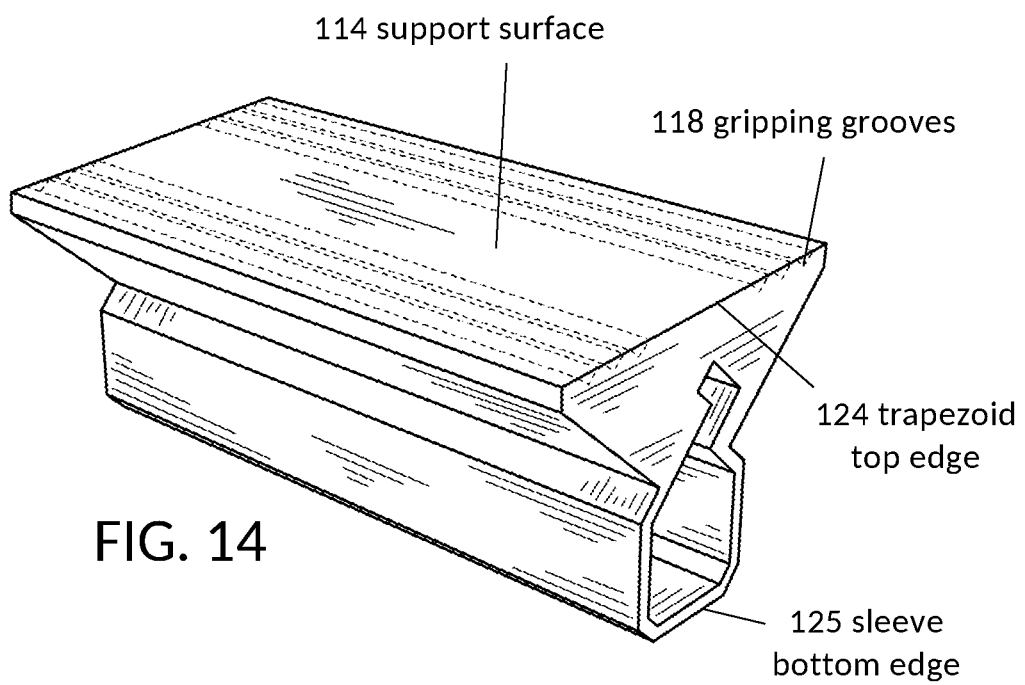
FIG. 14 is a perspective view of the first embodiment of the present disclosure (i.e. a chopstick buddie), where a trapezoid prism cap is permanently connected to a hollowed sleeve, allowing the chopstick buddie to be used on a variety of plain chopsticks, to support either the thumb base or the ring finger knuckle.
Figure 15:
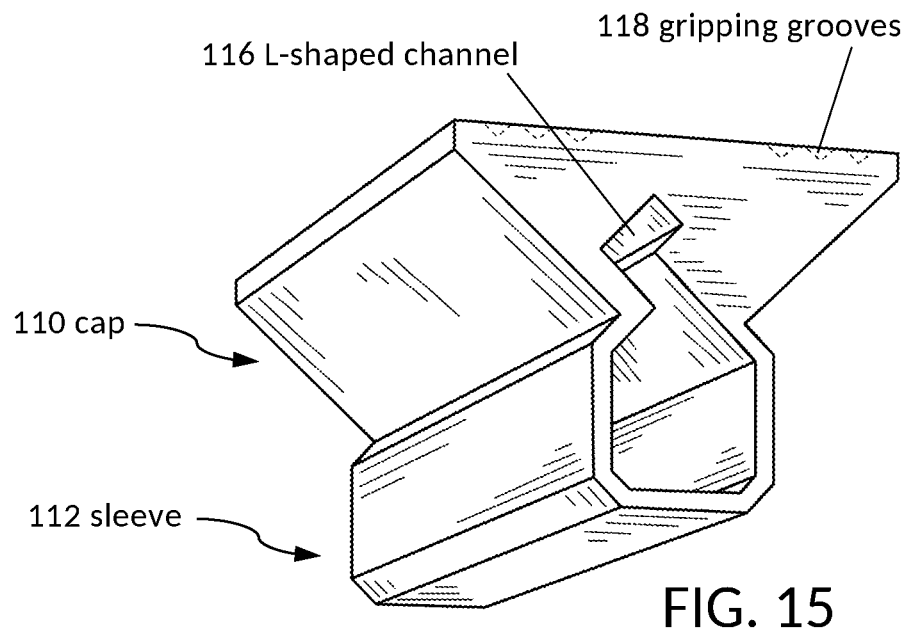
FIG. 15 is another perspective view of the same first embodiment shown in FIG. 14, where a trapezoid prism cap is permanently connected to a hollowed sleeve, showing the bottom of the sleeve, and a trapezoid side of the cap.

FIG. 14 illustrates the first embodiment of the present disclosure, the chopstick buddie. Support surface 114 is the large rectangular area facing upward. This large area may have gripping grooves 118 engraved into it to provide a nonslip contact surface for fingers. FIG. 15 illustrates another view of the same first embodiment. A chopstick buddie of the first embodiment comprises a trapezoid prism cap 110 and a hollowed sleeve 112. Both trapezoid prism cap and hollowed sleeve have lengths that run along the same axis. These two members are permanently connected in the first embodiment. But in other embodiments, these two members can be removably connected. The top face of the trapezoid prism is support surface 114. The wide top edge 124 of the trapezoid defines the width of support surface 114. The length of the trapezoid prism defines the length of support surface 114. The prism length is usually even larger than the width defined by wide top edge 124. Such length accommodates finger shifts during the use of chopsticks. The narrow bottom portion of the trapezoid connects with hollowed sleeve 112. The bottom trapezoid portion and the bottom edge 125 of sleeve 112 share a similar width, which is narrower than the wide top edge 124. The sleeve is a thin shell that surrounds a hollowed space in the shape of a chopstick segment. In the first embodiment, a square chopstick with rounded corners serves as a model for shaping the shell of the sleeve. But in general, a sleeve takes the shape of a polygonal tube, where the hollowed space formed by the inner wall of its tubular shell shares the same cross section as a target chopstick the sleeve receives. An L-shaped channel 116 is carved into the trapezoid prism body, to serve as an anchor channel for an optional adjustment strip.

Figure 16:
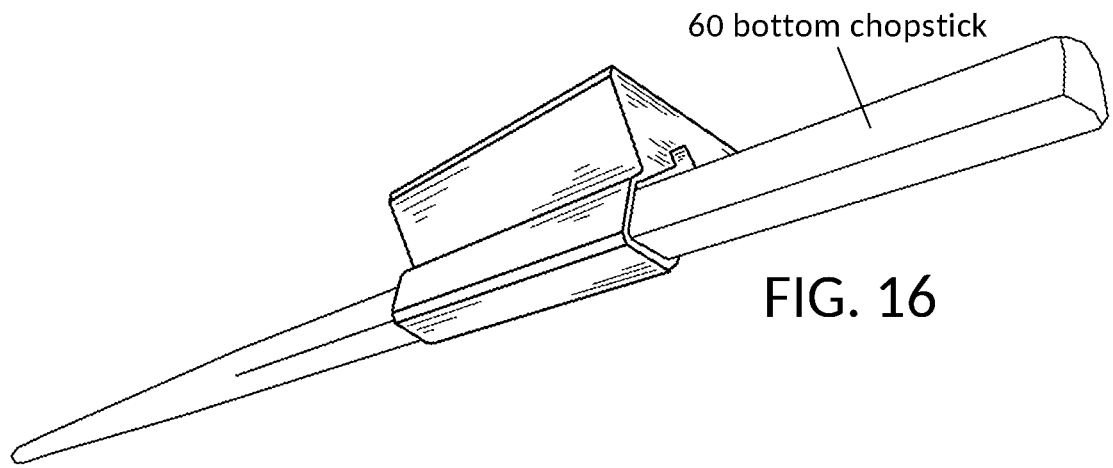
FIG. 16 is a perspective view of the chopstick buddie from FIG. 15, now attached to a chopstick.
Figure 17:
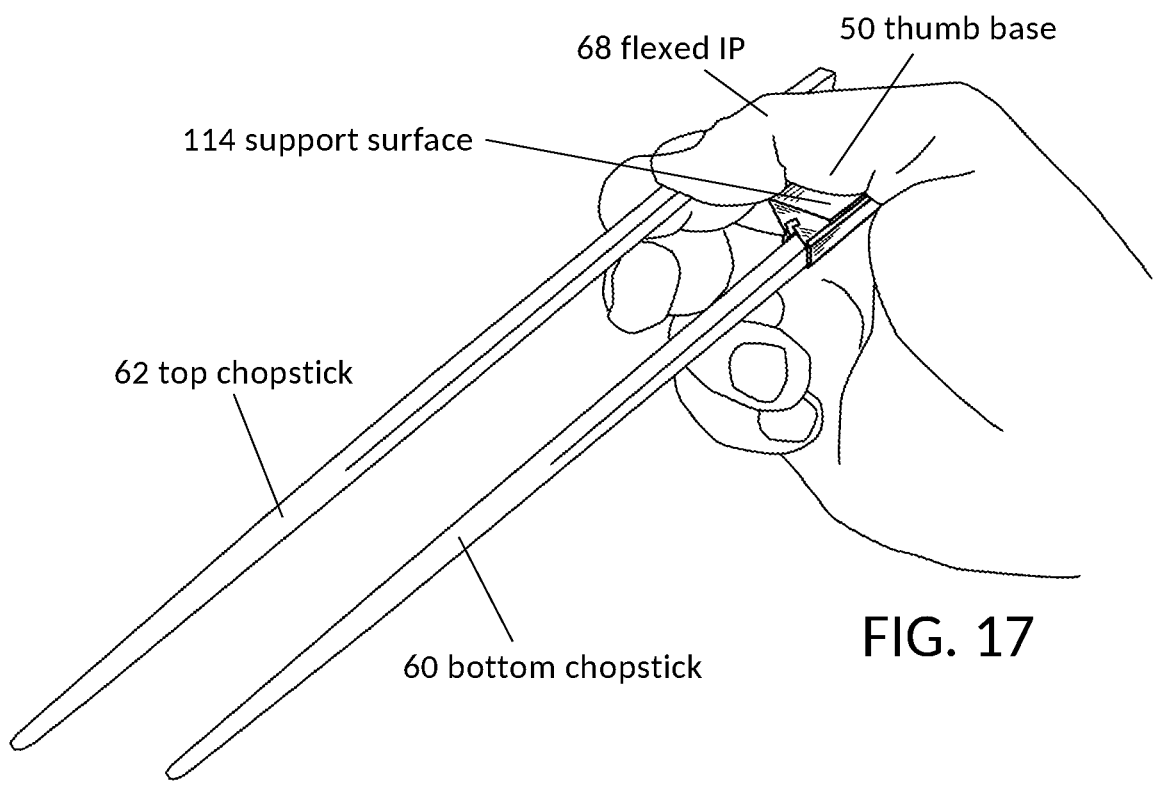
FIG. 17 shows a user resting the entire segment of the thumb base on the large support platform offered by the chopstick buddie from FIG. 16, creating a distance between the thumb base and the ring finger knuckle, yet leaving no wiggle room for the chopstick buddie to slip, roll, or topple away, thus keeping the bottom chopstick firmly secured in the hand.

FIG. 16 shows the chopstick buddie from FIG. 15, now attached to chopstick 60 with a square cross section. Both the cap and the sleeve have lengths that run along the longitudinal axis of chopstick 60. The sleeve of a chopstick buddie can be made in different shapes and sizes, to fit different styles of chopsticks. FIG. 17 illustrates a human hand holding chopstick 60 from FIG. 16, as the bottom chopstick. The hand secures the bottom chopstick using its thumb base 50 which pushes down on the large support surface 114 of the chopstick buddie. The height of the chopstick buddie allows the thumb to be raised. It also allows the tip segment of the thumb to bend comfortably, as shown by flexed IP joint 68. Despite this non-standard thumb pose, the pad of the thumb is still positioned properly, for it to participate in the planetary gear-like rolling of top chopstick 62, as prescribed by the standard grip. The trapezoid prism can be made in modified shapes and sizes, to fit different hands and individual needs of users.

Figure 18:
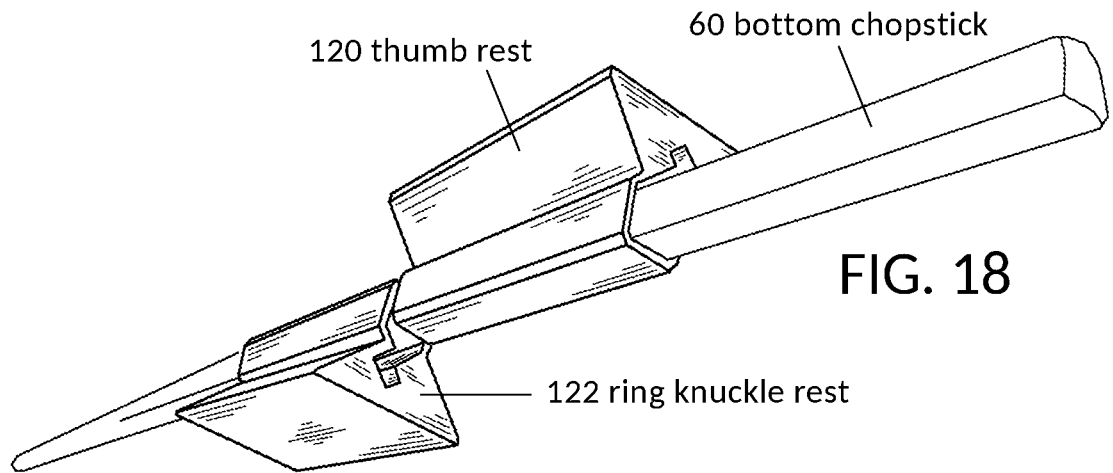
FIG. 18 shows two chopstick buddies of the first embodiment from FIG. 15, now attached to a chopstick, with their respective supporting surfaces facing off in opposite directions.
Figure 19:
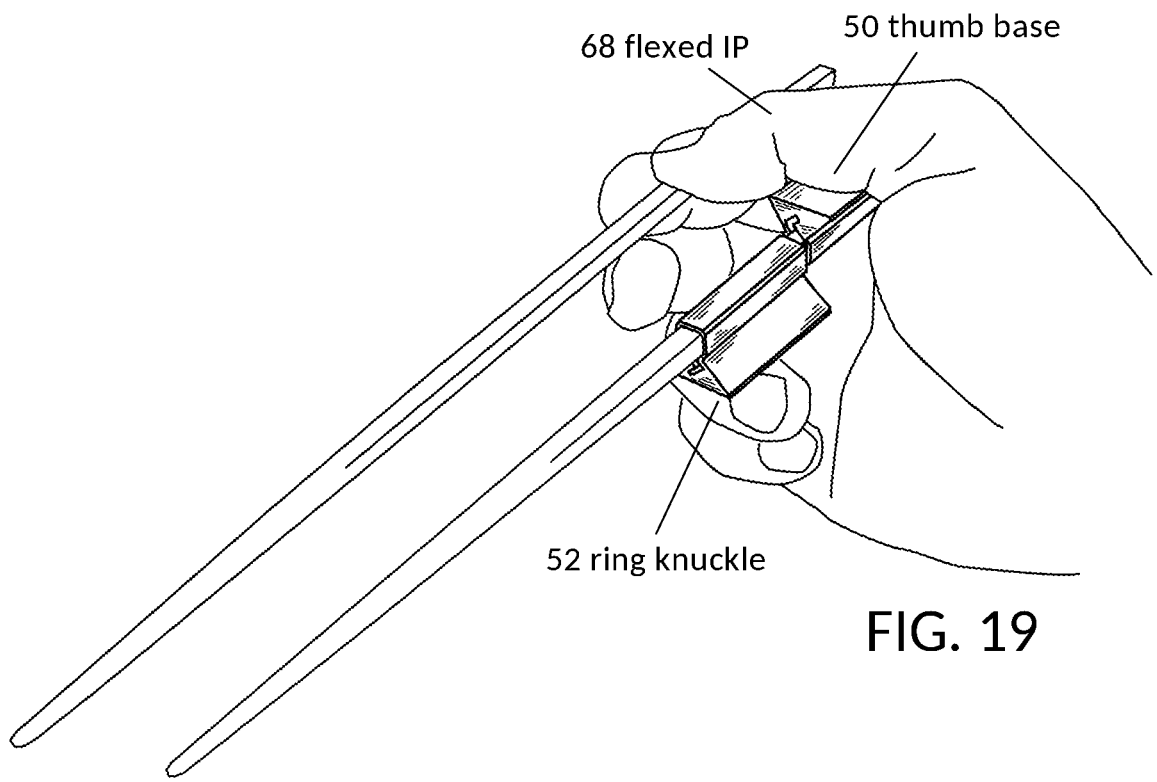
FIG. 19 shows a user holding the chopstick and two chopstick buddies from FIG. 18 between the thumb base and the ring finger knuckle, creating an even larger distance between the thumb base and the ring finger knuckle, compared to FIG. 17, and again leaving no wiggle room for either chopstick buddie to slip, roll, or topple away.

FIG. 18 shows two units of the chopstick buddie from FIG. 15, now attached in serial to bottom chopstick 60. The trapezoid prism caps of these two chopstick buddies serve as thumb rest 120 and ring knuckle rest 122. They are positioned and oriented in order to have their support surfaces engage with thumb base 50 and ring finger knuckle 52, respectively, as shown in FIG. 19. That is, the thumb rest has its support surface facing upward against the base of the thumb. The ring knuckle rest has its support surface facing downward against the knuckle of the ring finger. The addition of ring knuckle rest allows the thumb to be raised event higher, with respect to the ring finger knuckle, when compared to the use of a single thumb rest in FIG. 17. Again, the tip segment of the thumb can bend comfortably at flexed IP joint 68, in a non-standard thumb pose. And again, the pad of the thumb can still roll the top chopstick with the standard grip motion.

Figure 20:
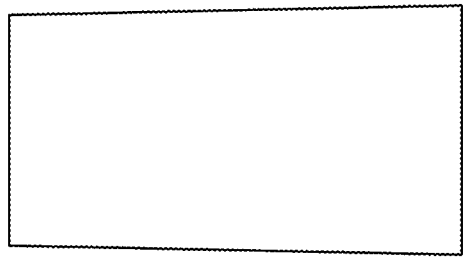
FIG. 20 is a top plan view of the chopstick buddie from FIG. 14.
Figure 21:
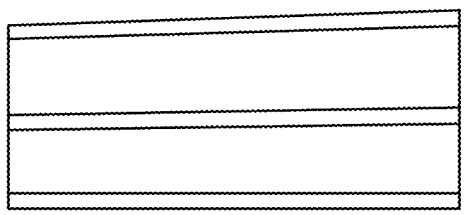
FIG. 21 is a front view of the chopstick buddie from FIG. 14.
Figure 22:
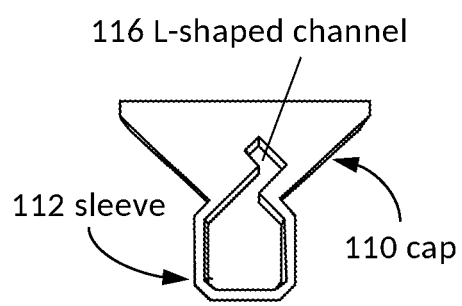
FIG. 22 is a right-side view of the chopstick buddie from FIG. 14.
Figure 23:
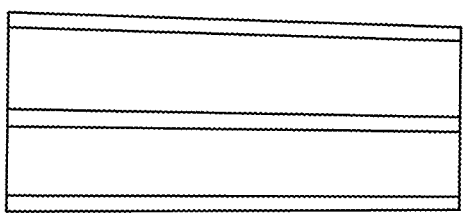
FIG. 23 is a rear view of the chopstick buddie from FIG. 14.
Figure 24:
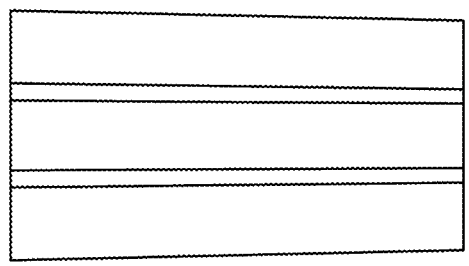
FIG. 24 is a bottom plan view of the chopstick buddie from FIG. 14.
Figure 25:
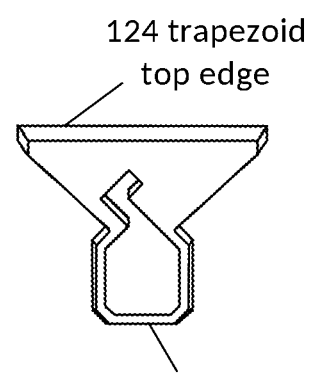
FIG. 25 is a left-side view of the chopstick buddie from FIG. 14.

FIG. 20, FIG. 21 and FIG. 22 show the top, the front and the right-side of the first embodiment, in respective orthographic projection views. FIG. 23, FIG. 24 and FIG. 25 show the rear, the bottom, and the left-side views of the same. The sleeve and its hollowed core taper slightly from right to left to accommodate the expected tapered shape of a square chopstick, for a good fit. Both FIG. 22 and FIG. 25 present a near cross-sectional view of the first embodiment, where cap 110 is shown presenting largely a trapezoid polygon as a profile, and sleeve 112 presenting largely a polygonal ring as its profile. The sleeve portion connects with the trapezoid portion at the narrow trapezoid part. FIG. 25 illustrates the contrast between the wide trapezoid top edge 124 and the narrow sleeve bottom edge 125. An L-shaped channel 116 is carved out of the trapezoid prism, shown in FIG. 22, as an anchor for an adjustment strip.

Figure 26:
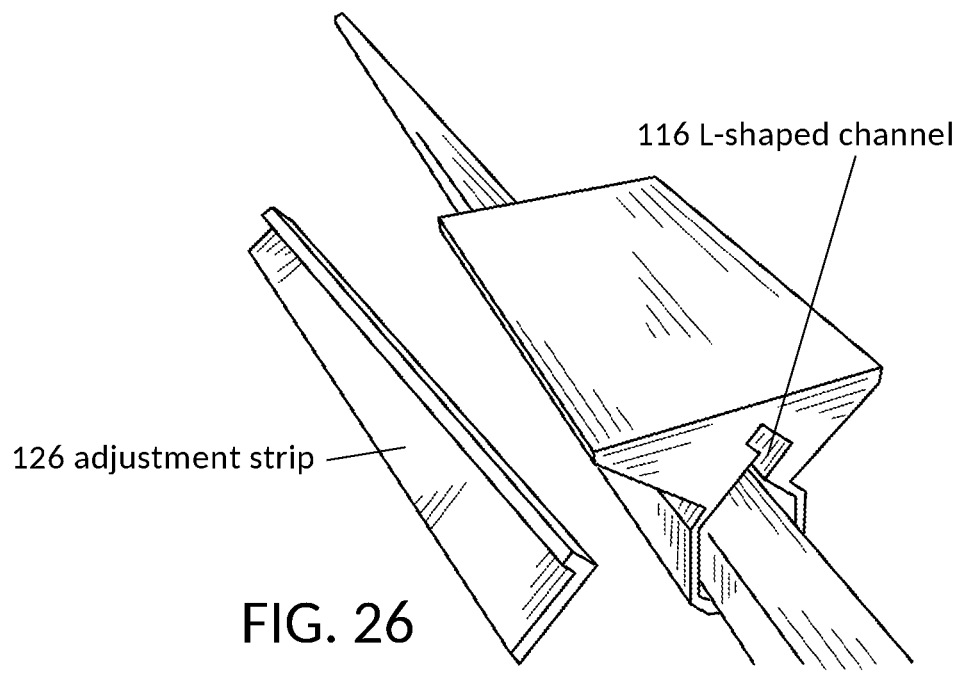
FIG. 26 shows a tapered adjustment strip next to the chopstick and the attached chopstick buddie from FIG. 16.
Figure 27:
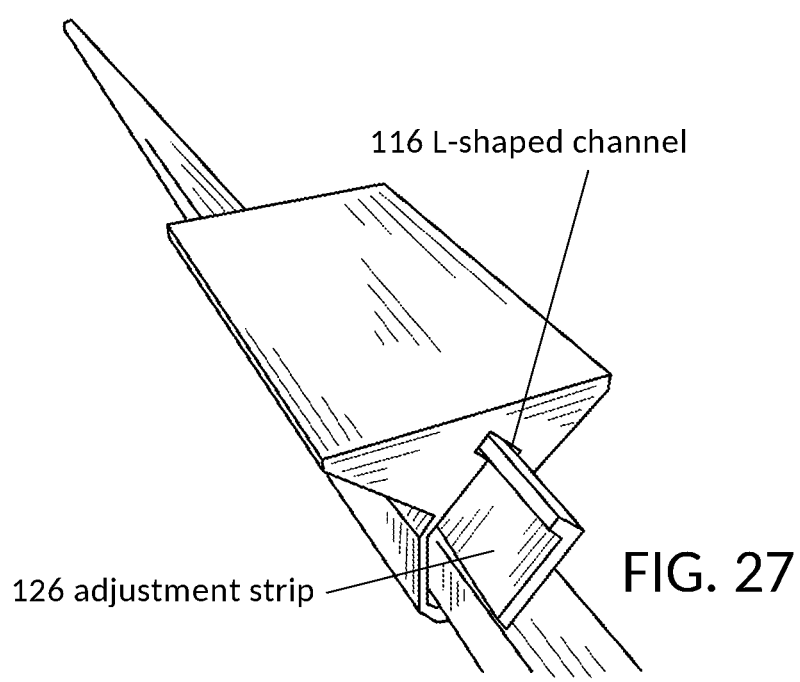
FIG. 27 shows the tapered adjustment strip from FIG. 26 wedged into the L-shaped channel in the trapezoid prism body of the chopstick buddie from FIG. 26, thus creating a tight seal that fastens the chopstick buddie to the chopstick.

FIG. 26 illustrates this adjustment strip 126. The width of the strip tapers from right to left. The adjustment strip 126 has an L-shaped end, to fit as a wedge into L-shaped channel 116, as shown in FIG. 27. When the right placement for a chopstick buddie is determined, the strip can be pushed in as far as possible for a tight seal to fasten the buddie to the chopstick. Then the two exposed ends of the strip can be trimmed off.

Operation of One Chopstick Buddie

The first embodiment of the present disclosure can be used alone, on a bottom chopstick. FIG. 17 shows how a user can wield a pair of chopsticks with the standard grip and its finger movements, without making the unnatural standard grip thumb pose described earlier, thanks to the use of a single chopstick buddie as a thumb rest. With the chopstick buddie, thumb base 50 rests on support surface 114, instead bottom chopstick 60. This creates a distance between the thumb base and the ring finger knuckle, allowing for a more comfortable hand posture for many users. The raised thumb base, in turns, enables the tip segment of the thumb to bend as shown by the flexed IP joint 68. This is a more comfortable thumb pose for many users. Other than these two comfort changes, all finger movements involved in wielding chopsticks remain identical to those of the standard grip. These finger movements include the signature motion of the standard grip, the planetary gear-like rolling of the top chopstick by the thumb, the index finger, and the knuckle of the middle finger. Thus, chopstick buddies are unlike other learning chopsticks and chopstick aids. Most of such aids actually hinder finger movements prescribed by the standard grip.

Figure 7:
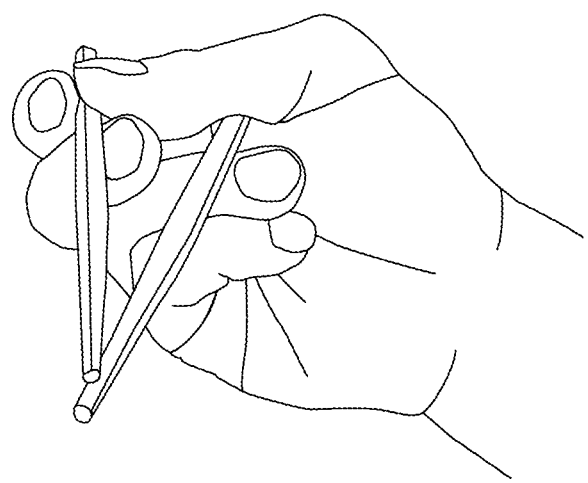
FIG. 7 is a front view of the right hand holding plain chopsticks from FIG. 4, at the closed posture, illustrating how the thumb pulls double duty, securing both chopsticks, and simultaneously twirling the top chopstick together with the index finger and the middle finger.
Figure 8:
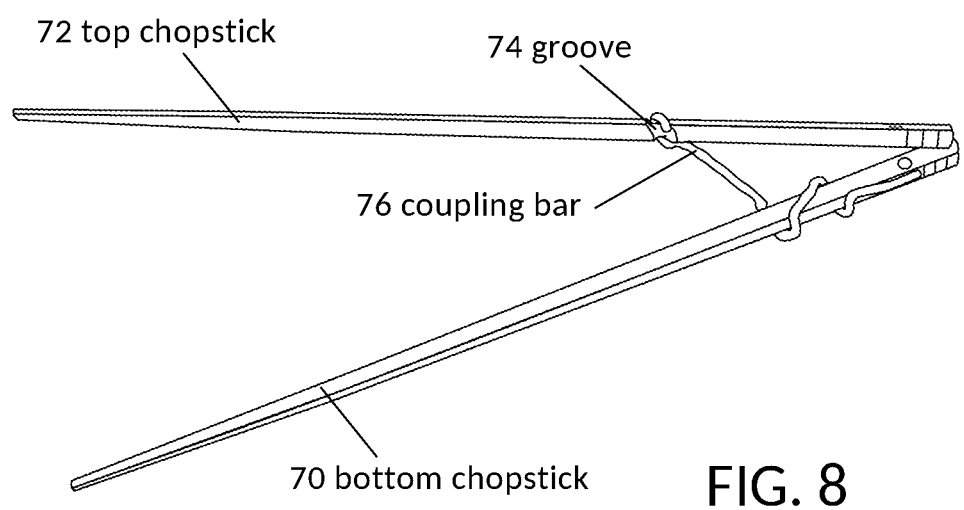
FIG. 8 is a view of a version of training chopsticks from my '037 application, showing the bottom chopstick, the carved top chopstick housing the circumferential groove, and a C-hook coupling bar connecting both chopsticks.
Figure 9:
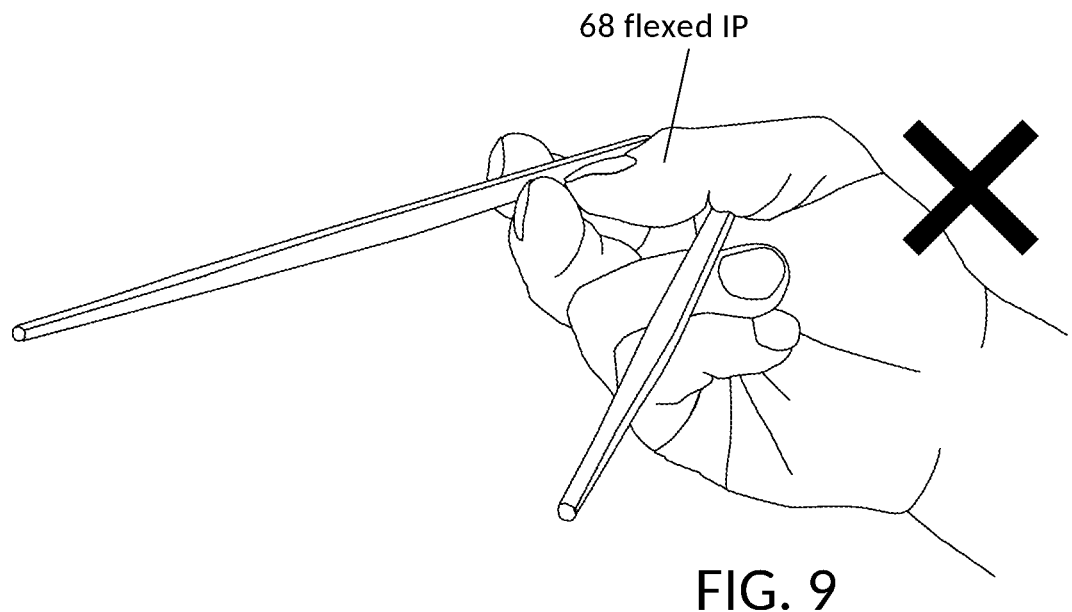
FIG. 9 is a view of a user with anatomical limitations attempting but failing to wield the pair of plain chopsticks from FIG. 3, at the open posture, due to the fact that the user is unable to completely extend the tip segment of the thumb, while flexing the base segment of the thumb, where the bending of the tip segment makes it hard for the tip of the thumb to properly grip the top chopstick, thus hampering the rolling of the top chopstick from this wide-open posture to the closed posture.
Figure 10:
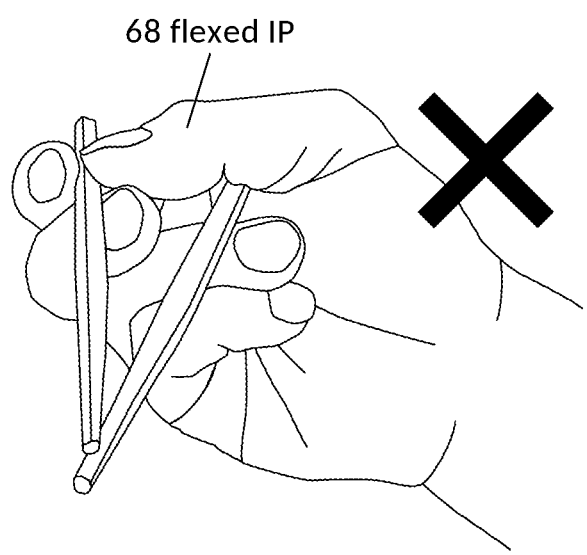
FIG. 10 is a view of a user with anatomical limitations attempting but failing to wield the pair of plain chopsticks from FIG. 4, at the closed posture, due to the fact that the user is unable to completely extend the tip segment of the thumb, while flexing the base segment of the thumb, where the arched thumb is unable to keep the bottom chopstick from sliding out of the standard grip position.
Figure 11:
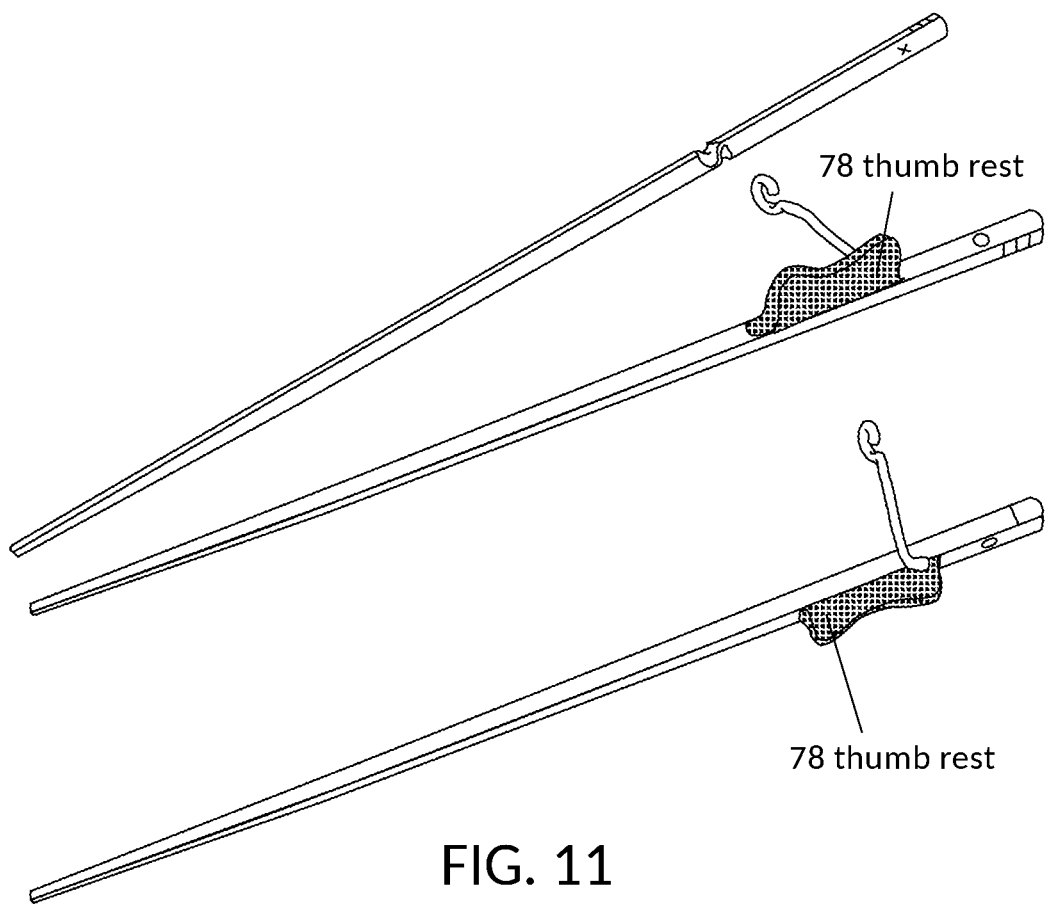
FIG. 11 is a view of another version of training chopsticks from my '037 application, showing a top chopstick with a circumferential groove, and a bottom chopstick with a coupling bar and an additional elevated thumb rest.
Figure 12:
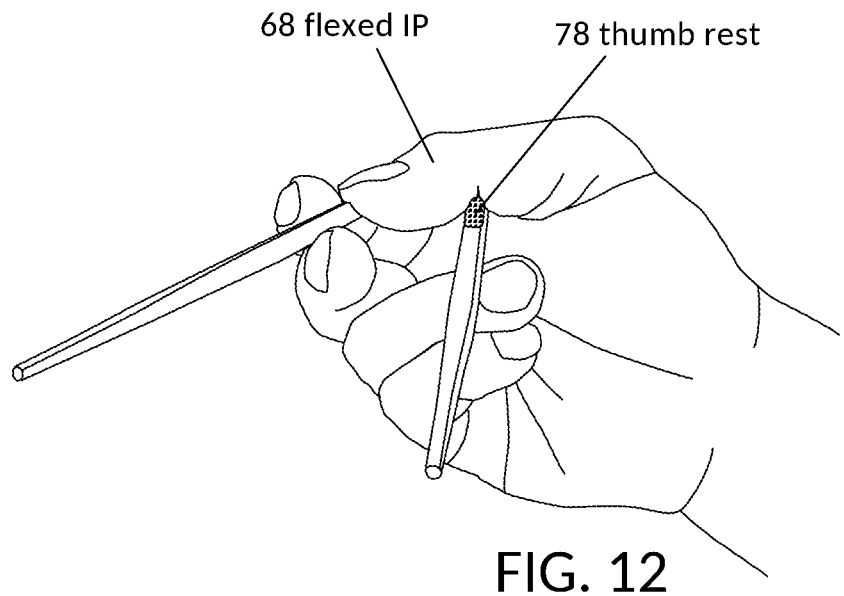
FIG. 12 illustrates how the training chopsticks from FIG. 11 allow users to operate chopsticks using the standard grip, at the open posture, with a non-standard thumb pose, by having the elevated thumb rest meet the arch of the thumb, thus enabling this non-standard thumb pose to properly roll the top chopstick with the thumb pad, resolving the issue illustrated in FIG. 9.
Figure 13:
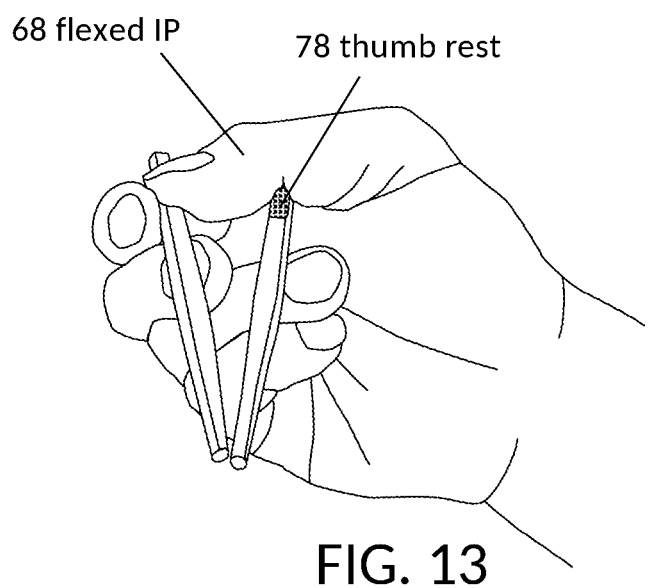
FIG. 13 illustrates how the training chopsticks from FIG. 11 allow users to operate chopsticks using the standard grip, at the closed posture, with a non-standard thumb pose, by having the elevated thumb rest meet the arch of the thumb, thus enabling this non-standard thumb pose to securely hold the bottom chopstick in place, resolving the issue illustrated in FIG. 10.

Raising the thumb base away from the ring finger could create a potential stability issue, when it comes to holding firmly the bottom chopstick between fingers. Compare the distance between the thumb base and the knuckle of the ring finger, as shown in FIG. 7 where the thumb almost lies on the same plane as the ring finger knuckle, and as shown in FIG. 17 where a chopstick buddie separates the two fingers. The increased distance between fingers in FIG. 17 urges a shear stress on the chopstick buddie, during movements of fingers as they extend chopsticks open, or snap them closed. This shear stress could nudge the bottom chopstick away from its proper placement, or even topple the chopstick buddie altogether.

However, the trapezoid prism shape of the cap neutralizes this shear stress, allowing a user to secure the bottom chopstick, despite having the thumb base comfortably distanced from the ring finger knuckle, as shown in FIG. 17. This stability is provided by the large support surface 114 of the trapezoid prism cap. The surface meshes with the entire base segment 50 of the thumb, disabling the ability of the chopstick buddie to rotate around the longitudinal axis of the bottom chopstick. Thus, the chopstick buddie will not topple.

While the support surface of the trapezoid prism cap is large, the cap tapers down to the diameter of a chopstick where the cap meets the sleeve. This trapezoid shape is designed to avoid interference with the hand and its fingers during the operation of chopsticks with the standard grip. This finger avoidance is another key factor distinguishing the present disclosure from other learning chopsticks and chopstick aids. Many such aids interfere with standard movements of fingers, forcing users to adopt instead non-standard finger movements.

Operation of Two Chopstick Buddies

The first embodiment of the present disclosure can also be used as a double unit, where two chopstick buddies are attached in serial on the bottom chopstick, as shown in FIG. 18. One chopstick buddie serves as thumb rest 120, and the second one serves as ring knuckle rest 122. In this configuration, the thumb base 50 rests on the upward-turned support surface of thumb rest, as shown in FIG. 19. At the same time, knuckle 52 of the ring finger pushes up against the downward-turned support surface of ring knuckle rest. This double unit of chopstick buddies increases the distance between the thumb base and the ring finger knuckle even further than a single unit, providing an even more comfortable hand posture. The tip segment of the thumb continues to be able to bend comfortably, for a comfortable thumb pose. This increased comfort does not come at the expense of flexibility, dexterity, range or power in the use of chopsticks with the standard grip and its finger movements. On the contrary, the double unit allows a user to operate chopsticks using all finger movements as prescribed by the standard grip, just like the single unit.

The trapezoid prism shape of ring knuckle rest 122 from FIG. 18 ensures that knuckle 52 of the ring finger makes firm and stable contact with its support surface, as shown in FIG. 19. This neutralizes the shear stress enabled by the increased distance between fingers. The bottom chopstick is thus kept stable throughout finger movements of the standard grip. With minimum compression forces, the thumb and the ring finger can thus hold the bottom chopstick secure, without having to worry about shearing movements.

Figure 4:
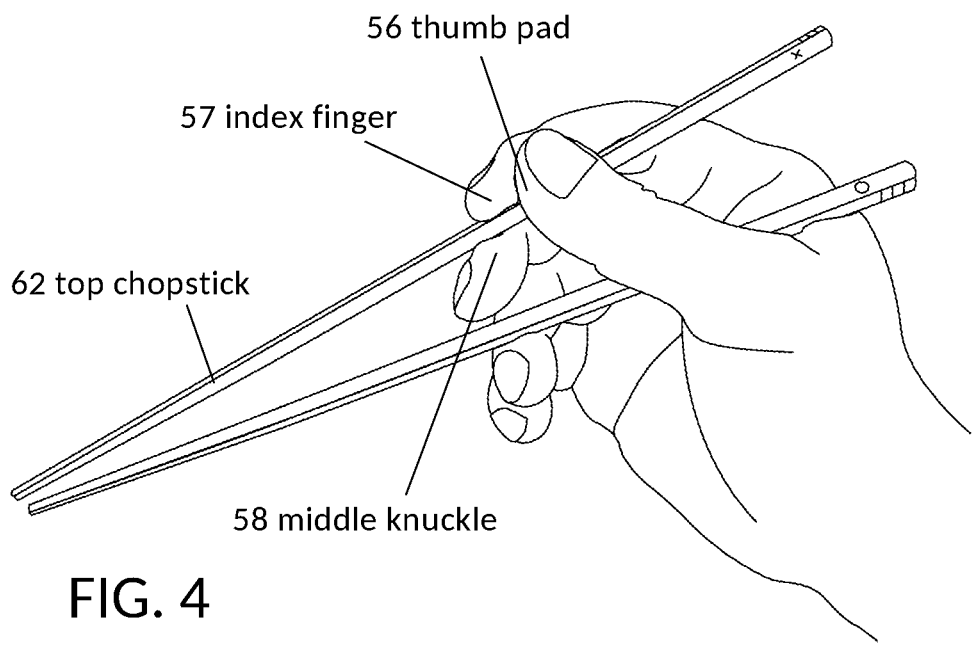
FIG. 4 is a view of a right hand holding a pair of plain chopsticks, now at the closed end of the standard grip and alternating motion.
Figure 5:
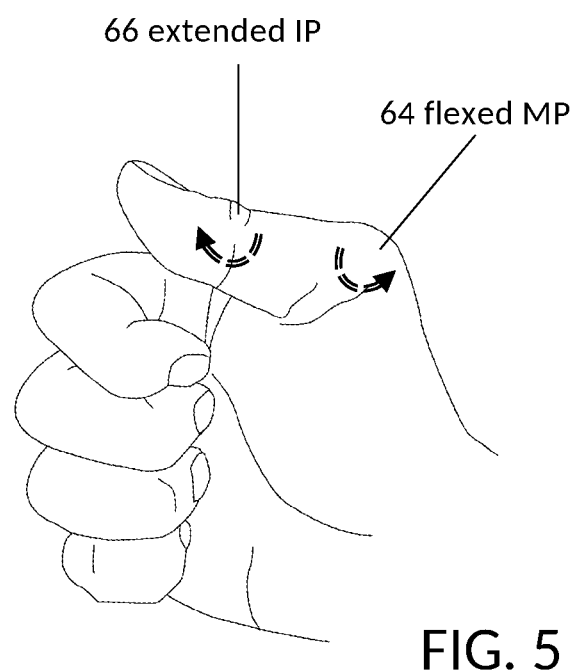
FIG. 5 illustrates the unnatural thumb pose prescribed by the standard grip, where the base segment of the thumb flexes (bends) inward, while the tip segment extends outward.
Figure 6:
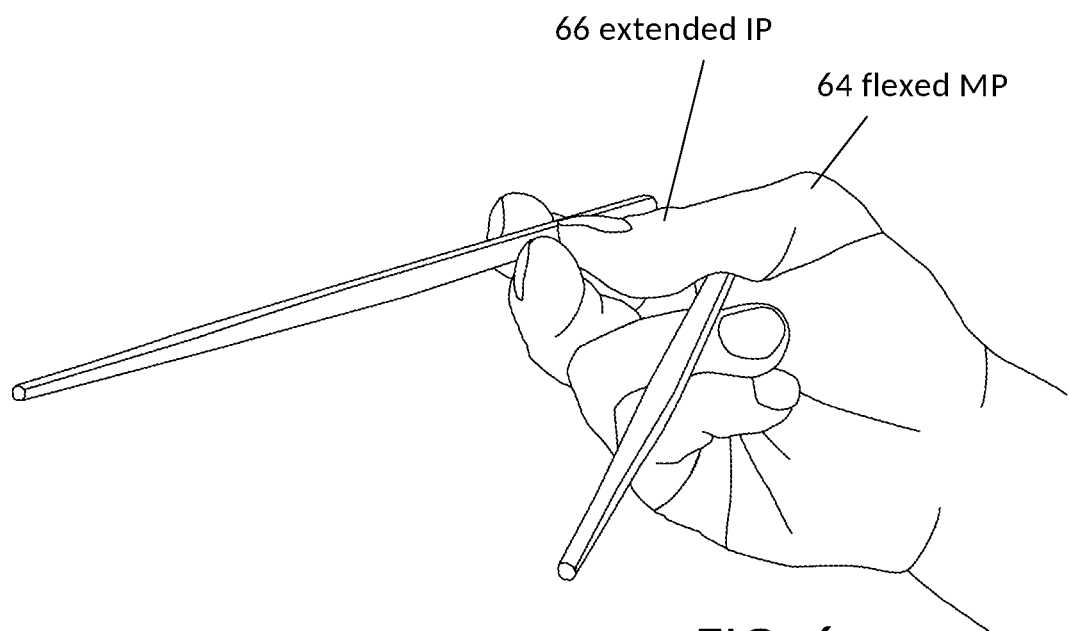
FIG. 6 is a front view of the right hand holding plain chopsticks from FIG. 3, at the open posture, illustrating how the thumb pulls double duty, securing both chopsticks, and simultaneously twirling the top chopstick together with the index finger and the middle finger.

The trapezoid shape of the ring knuckle rest is also designed to avoid interfering with fingers during the operation of chopsticks with the standard grip. In particular, the pulp of the middle finger comes very close to the bottom chopstick at the closed posture of the standard grip, as shown in FIG. 4. Any chopstick aid blocking the middle finger at the close posture would force a user to adopt instead non-standard finger movements. As shown in FIG. 19, the ring knuckle rest has a trapezoid prism that tapers as the cap meets the sleeve. This keeps clear the air space covered by the middle finger during chopstick motions. At the closed posture, the pulp of the middle finger will not come to abut any portions of the chopstick buddie.

Operation of a Single Ring Knuckle Rest

The first embodiment of present disclosure can also be used alone, as a ring knuckle rest, without the use of a thumb rest at the same time. Some users find this more comfortable than using only the thumb rest, or using both rests together. The use of a single ring knuckle rest is similar to what has already been described for the double unit above. Thus, the operation is not repeated here. However, without the thumb rest, the tip segment of the thumb, the index finger, and the middle finger shift downward. And the angle of the top chopstick held by these three fingers thus change slightly, in order for tips of both chopsticks to meet at the closed posture. Some users actually find this configuration more natural for their hands.

Second Embodiment of Chopstick Buddies

Figure 28:
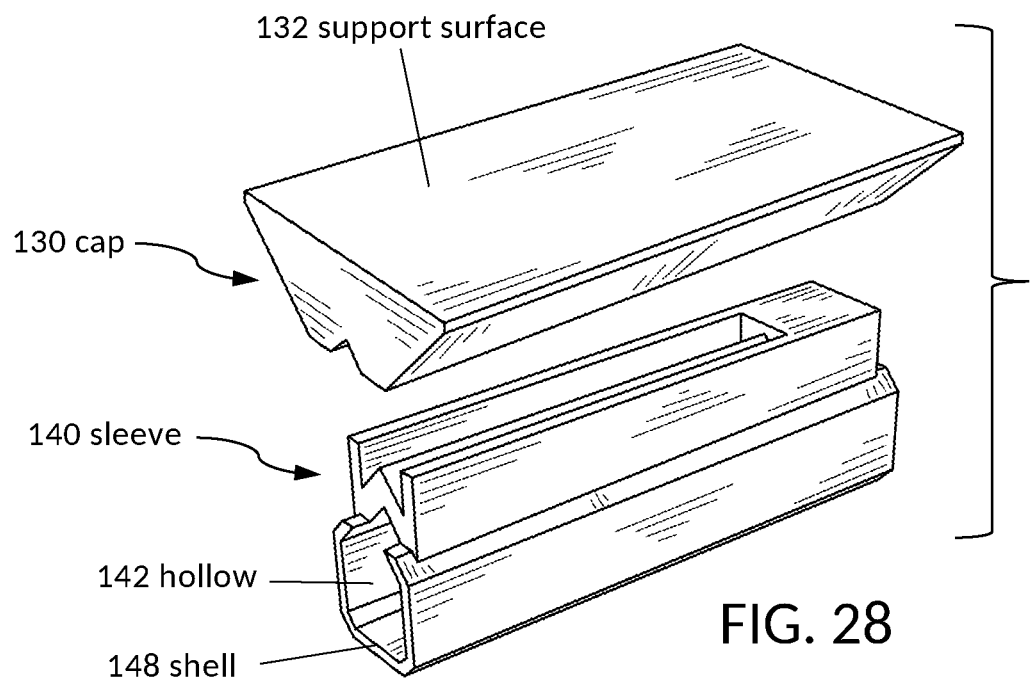
FIG. 28 is a perspective view of the second embodiment of the present disclosure (i.e. a chopstick buddie), where a trapezoid prism cap is independently made from a separate sleeve, such that each can be produced in different dimensions according to needs, and the two parts fit snugly via a variation of the mortise and tenon joint.

The second embodiment of the present disclosure is shown in FIG. 28. This embodiment shares the same physical outline as the first embodiment. That is, the cap portion 130 has the same trapezoid prism shape, and provides similar support surface 132. The sleeve portion 140 comprises a similar shell 148 around a hollow 142 modeled after a square chopstick. However, the second embodiment physically separates its cap 130 from its sleeve 140, thus allowing each portion to be made in different dimensions. Caps and sleeves of varied dimensions can then be used in different combinations according to needs. Personalized inscriptions may be engraved on both custom sleeves and custom caps. Different gripping grooves may be engraved on the support surface of custom caps.

Figure 29:
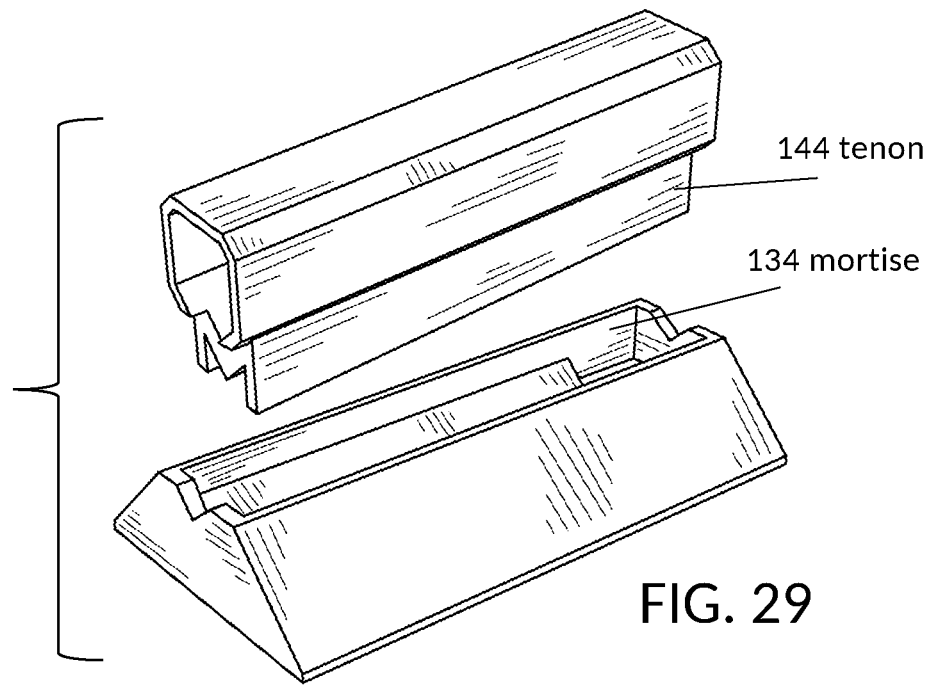
FIG. 29 is another perspective view of the cap and sleeve from FIG. 28, now flipped upside down, so that the sleeve with a tenon is shown on top, and the cap with a mortise recess is shown on the bottom.

Cap 130 and Sleeve 140 of the second embodiment are connected via a mortise-and-tenon joint. This is illustrated in FIG. 29 where cap 130 and sleeve 140 from FIG. 28 are flipped upside down, to clearly illustrate the mortise-and-tenon joint. Sleeve 140 provides tenon 144, which plugs into the mortise recess 134 cut into cap 130. The dimensions of mortise and of tenon are standardized for all variations of caps and sleeves derived from the second embodiment. This allows a large combination of custom caps and sleeves that suits varied personal requirements, and works on all chopsticks available on the market. While sleeve 140 is modeled after a square chopstick, other custom sleeves can be made for hexagonal chopsticks, octagonal chopsticks, etc. While cap 130 is of a recognizable trapezoid prism shape, custom caps of other shapes can be made and scaled to personal needs.

FIG. 30 is another perspective of cap 130 and sleeve 140 from FIG. 28. This view highlights the hollowed core 142 surrounded by shell 148 of sleeve 140. Right above the hollow 142 is a dome channel 146, carved out of tenon 144 of sleeve 140. This dome channel is used for fitting of the chopstick buddie to a chopstick. Cap 130 has s similar dome channel 136 carved out for the same purpose. The cap has a trapezoid top edge 133 which is wider than the trapezoid bottom edge 135. Trapezoid bottom edge 135 defines the approximate width of the portion of trapezoid prism cap 130 that connects with sleeve 140. The width of trapezoid bottom edge 135 is similar to the width of sleeve bottom edge 145.

FIG. 31 flips cap 130 and sleeve 140 from FIG. 30 upside down, to illustrate the same dome channel 136, dome channel 146 and hollowed core 142. The shell 148 of sleeve 140 surrounds both hollowed core 142 and dome channel 146. As shell 148 surrounds dome channel 146, it merges with the tenon 144 portion of the sleeve, in a graceful transition. FIG. 31 also offers a different view of tenon 144 which plugs into mortise 134.

Figure 32:
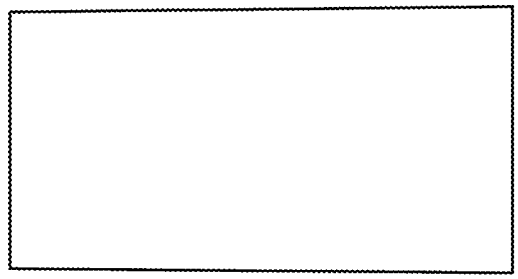
FIG. 32 is a top plan view of the cap from FIG. 28.
Figure 33:
FIG. 33 is a front view of the cap from FIG. 28.
Figure 34:
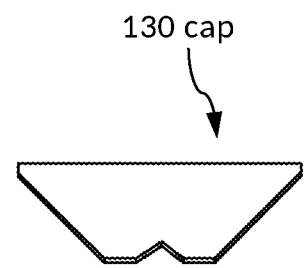
FIG. 34 is a right-side view of the cap from FIG. 28.
Figure 35:
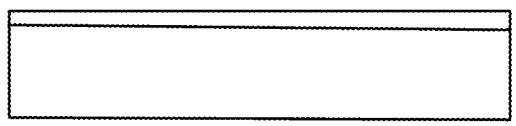
FIG. 35 is a rear view of the cap from FIG. 28.
Figure 37:
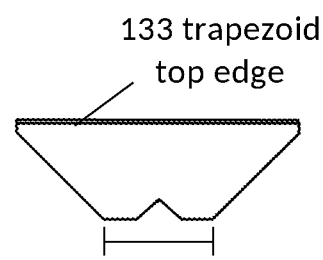
FIG. 37 is a left-side view of the cap from FIG. 28.
Figure 36:
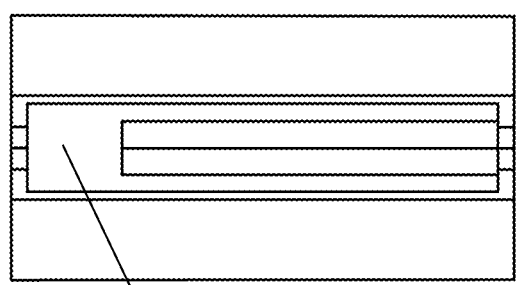
FIG. 36 is a bottom plan view of the cap from FIG. 28.

FIG. 32, FIG. 33 and FIG. 34 show the top, the front and the right-side of cap 130 of the second embodiment from FIG. 28, now in orthographic projection views. FIG. 35, FIG. 36 and FIG. 37 show the rear, the bottom, and the left-side views of the same. FIG. 36 illustrates the internal structure of mortise 134 in an unobstructed view. FIG. 34 and FIG. 37 present a profile view of cap 130 of the second embodiment, where cap 130 is seen largely as a trapezoid polygon. Both FIG. 34 and FIG. 37 illustrate the contrast between the wide trapezoid top edge 133 and the narrow trapezoid bottom edge 135.

Figure 38:
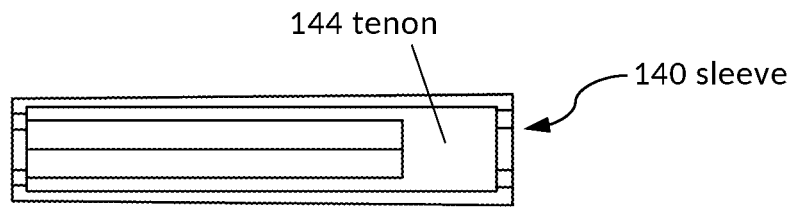
FIG. 38 is a top plan view of the sleeve from FIG. 28.
Figure 39:
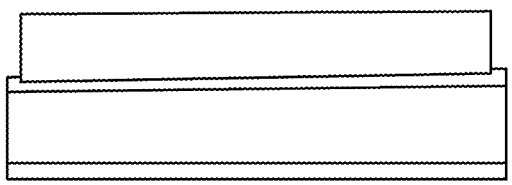
FIG. 39 is a front view of the sleeve from FIG. 28.
Figure 40:
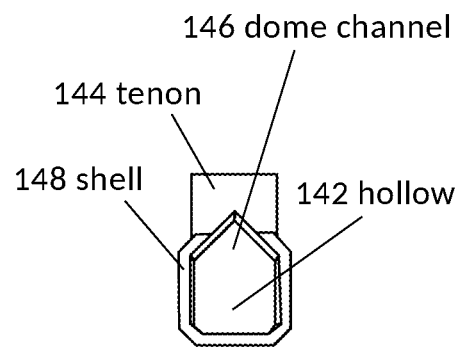
FIG. 40 is a right-side view of the sleeve from FIG. 28, highlighting the dome channel above the hollowed core.
Figure 41:
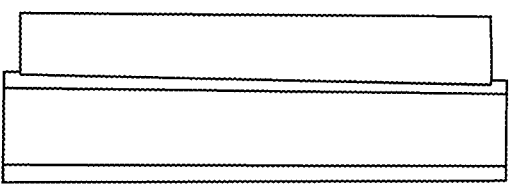
FIG. 41 is a rear view of the sleeve from FIG. 28.
Figure 43:
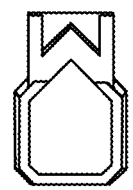
FIG. 43 is a left-side view of the sleeve from FIG. 28.
Figure 42:
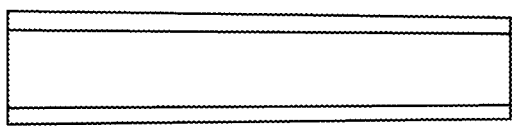
FIG. 42 is a bottom plan view of the sleeve from FIG. 28.

FIG. 38, FIG. 39 and FIG. 40 show the top, the front and the right-side of sleeve 140 of the second embodiment from FIG. 28, now in orthographic projection views. FIG. 41, FIG. 42 and FIG. 43 show the rear, the bottom, and the left-side views of the same. FIG. 38 offers an unobstructed view of the internal structure of tenon 144. Both FIG. 40 and FIG. 43 present a profile view of the sleeve of the second embodiment, where the sleeve is seen largely as a polygonal ring with a tenon. FIG. 40 illustrates without obstructions, spatial relationships between tenon 144, shell 148, hollowed core 142 and dome channel 146. Tenon 144 and shell 148 form one contiguous body. Hollowed core 142 and dome channel 146 are empty spaces defined by and contained within this contiguous body.

Figure 44:
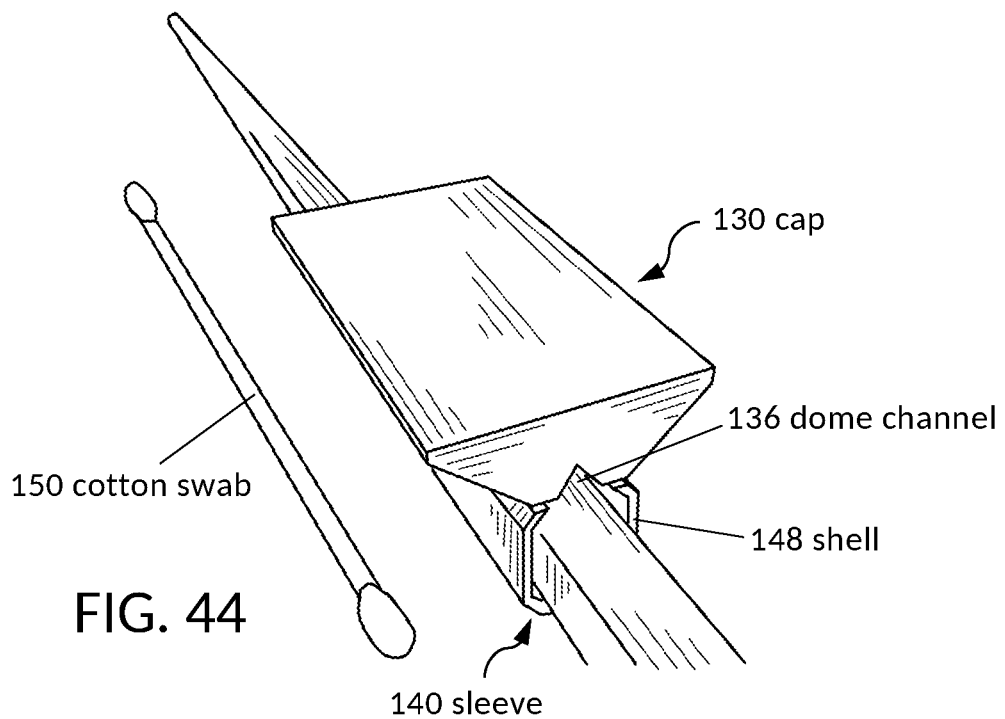
FIG. 44 is a perspective view of cap 130 and sleeve 140 from FIG. 28, now assembled into a chopstick buddie and attached to a chopstick, highlighting the dome channel, and a separate household cotton swab which can be inserted into the dome channel as a wedge.

FIG. 44 illustrates one adjustment strategy for the placement of the second embodiment on a chopstick. Cap 130 and Sleeve 140 from FIG. 28 are connected by the mortise-and-tenon-joint into one combined chopstick buddie. Then this combined buddie is attached to a chopstick. Shell 148 surrounds the chopstick, but there is a gap between the shell and the chopstick, indicated by dome channel 136. Depending on actual shape and size of the chopstick, the space observed through dome channel 136 will vary. This space can be filled in with a wedge. Many common houseful items provide a thin stick of the right dimension for the purpose of filling this space. For instance, cotton swabs found in most households contain a handle that fits the dome channel well. A cotton swab 150 is shown next to the chopstick buddy for illustration.

Figure 45:
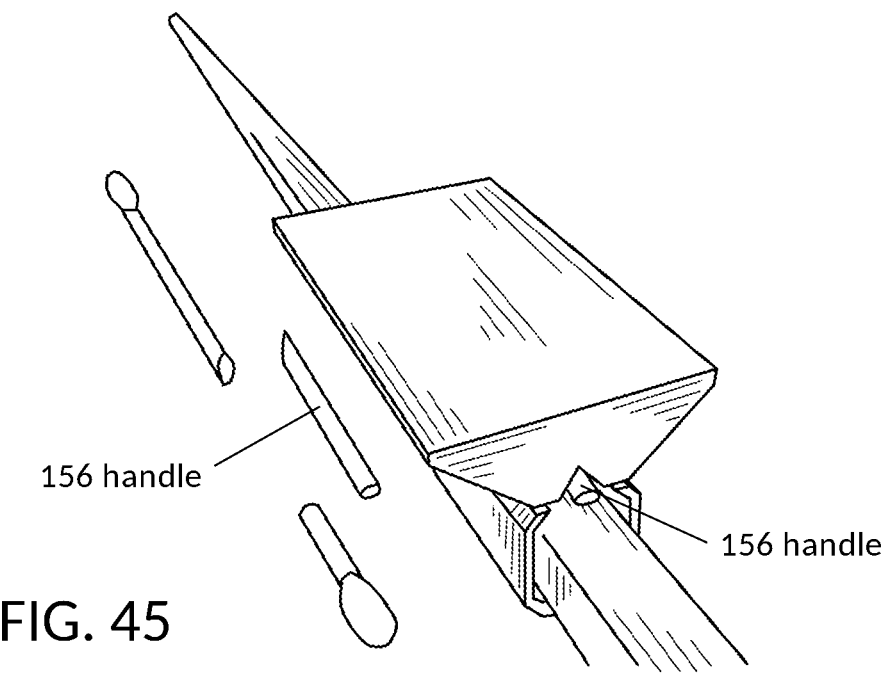
FIG. 45 shows the cotton swab from FIG. 44, now cut into sections, such that a section of its handle 156 can be inserted into dome channel 136 as a wedge, to create a tight seal that fastens the chopstick buddie to the chopstick.

As illustrated in FIG. 45, the cotton swab is cut with a pair of scissors to produce a short handle segment 156. This handle segment 156 is inserted into the dome channel as a wedge, to create a tight seal that fastens the chopstick buddie to the chopstick.

Operation of the Second Embodiment

Operation of the second embodiment is identical to that of the first embodiment, since both embodiments present the same profile. Therefore, the second embodiment can be used alone, as either a thumb rest or a ring knuckle rest. The second embodiment can also be used in a double unit, where both the thumb base and the knuckle of the ring finger are supported at the same time.

Alternative Embodiments

While this disclosure is susceptible to various modifications and alternative constructions, certain illustrative embodiments are shown in the drawings and are described in detail. It should be understood, therefore, that there is no intention to limit the disclosure to the specific embodiments disclosed, but on the contrary, the intention is to cover all modifications, alternative constructions, combinations, and equivalents falling within the spirit and scope of the disclosure.

The present disclosure has already discussed potential variations and extensions of illustrative embodiments shown in the drawings. These include variation in shape, dimension and structure of both the cap portion and the sleeve portion of a chopstick buddie. One mechanism for detaching and for joining the cap to the sleeve is illustrated in this disclosure, the mortise-and-tenon joint. Other types of joints may be used instead. Two strategies for adjusting and locking the placement of a chopstick buddie on a chopstick are illustrated in this disclosure: using an L-shaped strip, and using a common household item such as a cotton swab. Other adjustment and locking mechanism may be used instead. Labels may be engraved on buddie surfaces. Gripping grooves may be carved into buddie surfaces. For all embodiments, further-derived forms can be produced to accommodate children, adults, and other hand shapes or sizes in between.

Furthermore, chopstick buddies may be permanently mounted on a bottom chopstick. For instance, chopstick buddies may be carved out of a single piece of wood or bamboo, together with a chopstick, so that they form one single body. In this configuration, the shell portion of the sleeve can be merged into the chopstick body, without visible shell protrusions on the chopstick surface.

Chopstick buddies disclosed here can be used in combination with training chopsticks in my '037 application. This disclosure is a continuation-in-part of the '037 application. A chopstick buddie can be attached to a pair of '037 training chopsticks, in place of the '037 thumb rest. A chopstick buddie can also be attached to training chopsticks, with the cap facing downward, to serve as a ring knuckle rest. Chopstick buddies may also be used with the ergonomic chopsticks from my '029 application.

Choices for plain chopsticks are not limited to square Japanese ones shown in this disclosure. Chinese style, hexagonal, octagonal, and even round chopsticks can be used as base models. Materials used for chopstick buddies may vary, including wood, bamboo, plastic, flexible rubber, metal, and any nontoxic material. Chopstick buddies may be cast from mold, milled from source materials, printed on 3D-printers, or otherwise produced.

CONCLUSION

Chopstick buddies allow a human hand to wield chopsticks with the traditional, standard grip and its finger motions, without the awkward and unnatural thumb pose that is otherwise required by the standard grip. Chopstick buddies can be mounted on the bottom chopstick, alone or as a double unit. They separate the thumb far apart from the ring finger, providing a chopstick holding pattern more compatible with the anatomy of the human hand. Yet their trapezoid prism construction allows the thumb and the ring finger to firmly secure the bottom chopstick with little effort, unlike the traditional way. At the same time, the trapezoid prism shape allows buddies to avoid interfering with finger movements of the standard grip. Despite not using the required thumb pose of the standard grip, users still enjoy benefits of this efficient standard grip, including the ability to extend tips of chopsticks wide apart to embrace a food item, to manipulate chopsticks with dexterity, and to generate enough compression force to hold food items firmly between tips, with ease.

I claim:

1. An attachment to a chopstick, comprising:
a cap;
a sleeve;
said cap comprising a substantially polyhedron prism portion;
said sleeve comprising a substantially polygonal tube portion;
said cap and sleeve having lengths parallel to the longitudinal axis of a chopstick;
said polyhedron prism being connected with said polygonal tube along their longitudinal axes, with said polyhedron prism and said polygonal tube are arranged one on top of another;
said polygonal tube comprising an inner wall formed by tubular shell; and
said inner wall surrounding and defining a hollowed core space that is capable of receiving a chopstick.

2. The attachment of claim 1 further comprising:
said polyhedron prism having a cross section in the shape of a trapezoid polygon;
said trapezoid polygon having a trapezoid top edge and a trapezoid bottom edge; and
said trapezoid top edge being wider than said trapezoid bottom edge.

3. The attachment of claim 1 further comprising:
said cap further comprising a support surface located at the top of said cap; and
said support surface having a longitudinal length larger than its width.

4. The attachment of claim 1 further comprising:
a chopstick; and
said sleeve being permanently mounted on said chopstick.

5. The attachment of claim 1 wherein said cap is built permanently into said sleeve.

6. The attachment of claim 1 wherein said cap and said sleeve are separate members that can be removably-connected.

7. The attachment of claim 6 further comprising:
said sleeve further comprising a tenon portion located at the top of the sleeve; and
said cap further comprising a mortise recess shaped to receive said tenon portion.

8. The attachment of claim 1 further comprising:
a cap bottom portion located at the bottom of said cap;
said inner wall being provided with a gap on the top section of said tubular shell; and
said cap bottom portion being provided with a hollowed channel along its longitudinal axis such that said hollowed core space, said gap and said hollowed channel form one contiguous space.

9. The attachment of claim 8 further comprising:
said cap further comprising a support surface located at the top of said cap;
said support surface being provided with gripping grooves running longitudinally;
said polyhedron prism having a cross section in the shape of a trapezoid polygon;
said cap bottom portion being shaped such that the cross section of said hollowed channel forms the letter L; and
said inner wall being shaped such that said hollowed core space represents a substantially square prism, and is capable of receiving a chopstick with a square cross section.

10. The attachment of claim 8 further comprising:
said sleeve further comprising a tenon portion located at the top of the sleeve;
said cap further comprising a mortise recess shaped to receive said tenon portion;
said polyhedron prism having a cross section in the shape of a trapezoid polygon;
said cap bottom portion being shaped such that the cross section of said hollowed channel forms a triangle;
said tenon portion being provided with a hollowed dome along the longitudinal axis of said tenon portion such that said hollowed dome represents the same space as said triangular hollowed channel; and
said inner wall being shaped such that said hollowed core space represents a substantially square prism, and is capable of receiving a chopstick with a square cross section.

\* \* \* \* \*